W. E. BEEDE.
ELECTRICAL MEASURING INSTRUMENT.
APPLICATION FILED MAY 22, 1915.
1,220,587.
Patented Mar. 27, 1917.
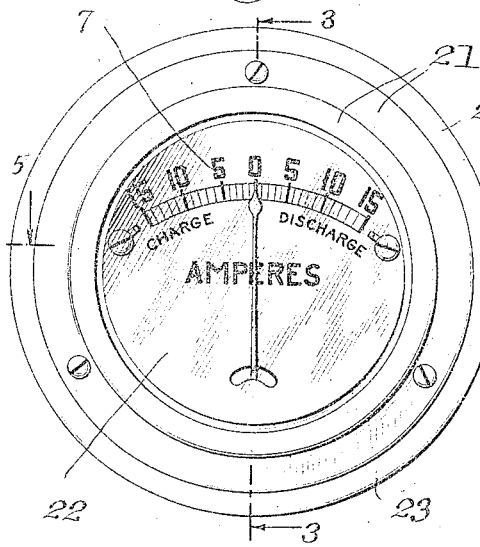
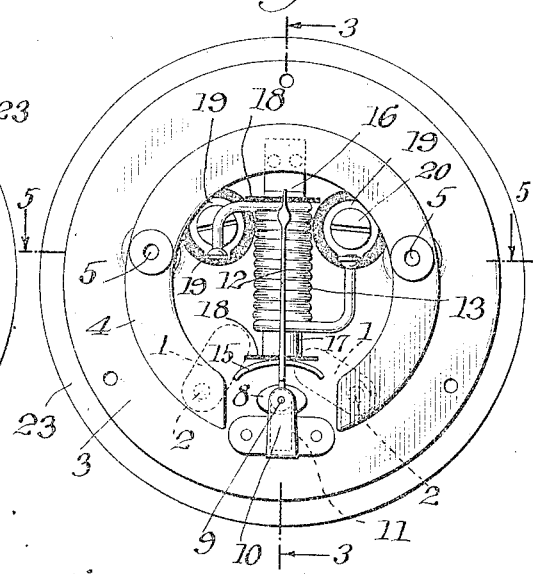
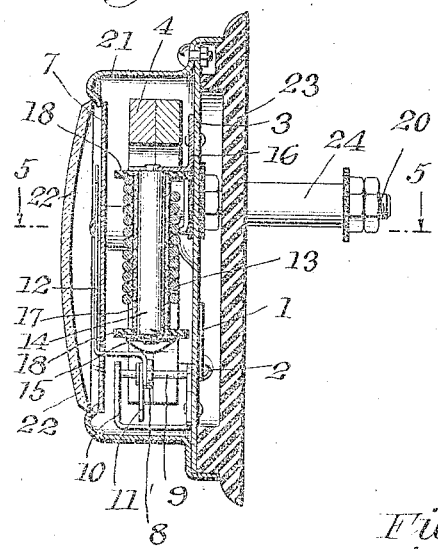
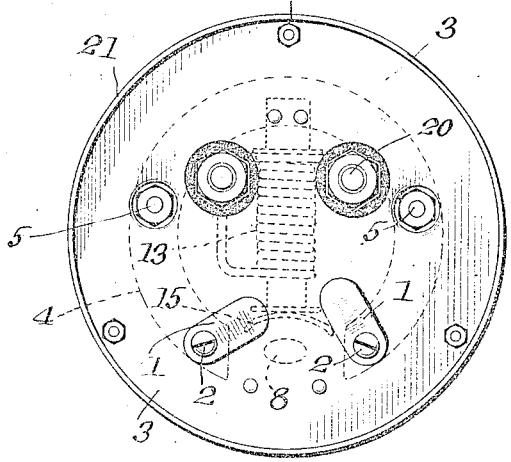
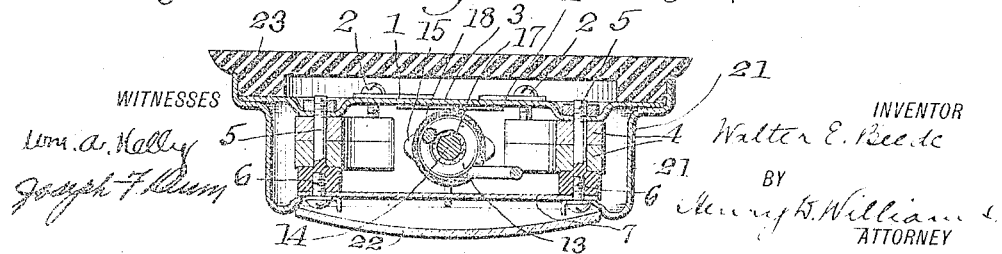
WITNESSES
Wm. A. Kelly
Joseph F. Dunn
INVENTOR
Walter E. Beede
BY
Henry B. Williams
ATTORNEY

UNITED STATES PATENT OFFICE.

WALTER E. BEEDE, OF NEW YORK, N. Y.

ELECTRICAL MEASURING INSTRUMENT.

1,220,587.   Specification of Letters Patent.   Patented Mar. 27, 1917.

Application filed May 22, 1915. Serial No. 29,843.

*To all whom it may concern:*

Be it known that I, WALTER E. BEEDE, a citizen of the United States, residing at borough of Manhattan, city of New York, in the county of New York and State of New York, have invented certain new and useful Improvements in Electrical Measuring Instruments, of which the following is a specification, reference being had therein to the accompanying drawings, forming part thereof.

My invention relates to electrical measuring instruments of that kind which are adapted to give readings or current indications at opposite sides of a zero point, and relates more particularly to such instruments in which a permanent field magnet is employed for biasing or giving direction to a pivoted magnetic armature which is adapted to be displaced or deflected one way or the other relative to the zero point, according to the direction of current through an adjacent electric coil.

In instruments such as referred to above great difficulty has been encountered in efforts to so construct them that they will give similar or corresponding current indications at each side of the zero point, so that accurate current indications will be given at both sides of the zero point of a symmetrically calibrated scale over which an indicating pointer moves. This difficulty is largely due to the fact that in practice it has proved impossible to attain sufficient exactness of form and accuracy of relative location of the magnetically coöperating parts of the meter, any slight inaccuracy in construction causing the indicating pointer to move over different distances at opposite sides of the zero point corresponding to the same current strength and thereby necessarily giving an inaccurate indication at either one or both sides of the zero indication on the calibrated scale. Commonly heretofore electrical measuring instruments have only been provided with means for adjusting the movements of the indicating pointer relative to the scale as a whole and while such means answer the purpose for a calibrated scale reading from zero in one direction only, it is evident that they would not suffice in the case of a double scale having a middle zero point, as correction could be made for one side of the scale only. Heretofore in some instances with expensive instruments, each instrument has been provided with a dial which was especially calibrated in accordance with tests of that particular instrument.

A present extensive use of instruments of the type mentioned, that is, which give current indications at one or the other side of a zero point according to the direction of the current, is in electric lighting or lighting and engine starting equipments of motor vehicles, where they are employed to indicate the strength of the current flowing to or from a storage battery, and for this purpose the double calibrated dial, in addition to its calibrations, is commonly also marked with words, such, for example, as "Charge" and "Discharge," to indicate whether the storage battery is receiving a charge or the current is being used therefrom. In these instruments accuracy of indication at both sides of the zero point is important, and although accuracy was not commonly obtained, the expense of manufacture of the instrument was considerably increased by efforts to obtain as close an approximation to accuracy as was possible.

The principal object of my invention is to produce an instrument which can be adjusted to overcome or compensate for slight inaccuracies of manufacture so as to obtain correct indications at both sides of the zero point on a previously calibrated scale. Other objects of my invention are reliability, simplicity of construction, inexpensiveness of manufacture, and other objects and advantages which will hereinafter appear.

My invention broadly includes means for producing a differential effect in or for distorting the magnetic field to vary the current indications at opposite sides of the zero point so that correct current indications will be given at both sides of the zero point on the calibrated scale; such, for example, as a weak pivoted polar extension from each of the opposed poles of a permanent field magnet. My invention more particularly includes features of construction and combinations of parts as will appear from the following description.

I shall now describe the electrical measuring instrument embodying my invention illustrated in the accompanying drawings and shall thereafter point out my invention in claims.

Figure 1 is a face view or front elevation of an electrical measuring instrument embodying my invention.

Fig. 2 is a similar view with the front part of the casing and dial removed.

Fig. 3 is a central vertical section on a plane indicated by the lines 3—3 of Figs. 1 and 2 as viewed from the right and of Fig. 4 as viewed from the left.

Fig. 4 is a rear view of the instrument with the base plate removed.

Fig. 5 is a horizontal section on a plane indicated by the lines 5—5 of Figs. 1, 2 and 3 as viewed from above.

In the embodiment of my invention illustrated in the accompanying drawings, pivotally shiftably paramagnetic adjusting members 1 are provided and these members comprise thin strips of magnetizable material such as soft iron which at one end are adjustably pivoted by means of magnetizable screws 2 to a non-magnetic back plate 3 of the instrument. The magnetizable pivot screws 2 project inward through the back plate 3 toward and preferably, as shown in the drawings, into contact with the spaced opposed poles of a permanent circular or ring-shaped field magnet 4, shown as made up of two plates or laminæ. The back plate 3 is shown as having indentations forming inward projections or protuberances upon which the field magnet 4 is supported in spaced relation to the flat main portion of the back plate 3 by means of bolts 5, the enlarged cylindrical heads of which form spacers at the front of the magnet 4 and receive screws 6 which support a non-magnetic dial 7 in spaced relation to the magnet 4. The dial 7 is shown as provided with a symmetrically calibrated scale reading in both directions from a middle zero point, that is to say, both parts of the scale are alike excepting that one part reads from the middle to the left and the other part reads from the middle to the right, the part of the scale at the left of the zero point being marked "Charge" and the part of the scale at the right of the zero point being marked "Discharge."

A paramagnetic pivoted armature 8, shown as of rounded elongated or oval shape, is located in the magnetic field of the magnet 4 between the opposed poles thereof. The armature 8 is carried by an arbor 9 the ends of which are pivotally supported by a sheet metal bracket 10 fixed on the back plate 3. The arbor 9 also carries a non-magnetic counter-weight 11 and a non-magnetic pointer or indicating hand 12 which projects through a slot to the front of the dial 7 for coöperation with the calibrated scale thereon. A coil 13 is shown as located within the ring formed by the field magnet 4 and arranged to produce a magnetic field at right-angles to that produced by the field magnet 4 between its poles. For strengthening its field the coil 13 has a non-magnetized paramagnetic core 14 which, at the end adjacent to the pivoted armature 8, is provided with a thin transversely projecting curved head 15 which partly bridges the space between the poles of the magnet 4 at the side of the pivoted armature 8 and advantageously distributes the magnetic field produced by the coil 13. At its other end from the magnetizable head or pole piece 15, the magnetizable core 14 is supported on the back plate 3 by an L-shaped bracket 16. The turns of the coil 13 are insulated from each other by an insulating covering of enamel, for example, and the coil 13 is additionally insulated from its core 14, pole piece 15 and supporting bracket 16 by means of an insulating tube 17, which may be of paper or celluloid, and insulating end plates 18, which may be of vulcanized fiber. The free ends of the coil 13 are shown as soldered to conductive standards 19 which are held in place on the back plate 3 by and are in electrical connection with bolts 20 which form conductive attaching stems for the instrument and also serve as binding posts for the circuit wires, the conductive standards 19 and the attaching stems 20 being insulated from the conductive back plate 3 as shown in the drawings. A thin non-magnetic metal casing 21 is shown as secured by means of small bolts to the outer edge or margin of the back plate 3 and the casing part 21 is closed at the front by a crystal glass 22. The instrument has a base plate 23 of suitable insulating material, such as hard rubber, which is held in place by means of insulating sleeves 24 on the attaching stems 20.

In the operation of the instrument, the current indications of the pointer 12 on the calibrated dial 7 are influenced by the shape and relative positions of the field magnet 4, magnetizable armature 8 and magnetizable pole piece 15. The pivotally shiftable paramagnetic adjusting members 1 constitute weak polar extensions from the opposed poles of the permanent field magnet 4. By slightly loosening the magnetizable pivot screws 2 the adjusting members 1 may be shifted to different pivotal or angular positions, each independently of the other. These pivotally movable polar extensions may be employed to adjust the strength of the available magnetic field as a whole and also may be employed to produce a distortion or differential effect in the magnetic field. By pivotally shifting both of the members 1 proportionately or correspondingly, the strength of all parts of the magnetic field will be equally affected and the movements of the pointer 12 will be similarly affected throughout the length of the scale. However, if these two members 1 be adjusted to different angular positions, for example as illustrated in the accompanying drawings, they will then act with a distorting or differential effect upon the magnetic field of the permanent magnet 4, as such field may be influenced by the coil 3 and its magnetic core 14 and pole piece 15, and the movements of the pointer 12 will be correspondingly differentially affected so that for the same strength of current the pointer 12 will move farther over one of the parts of the calibrated scale and not so far over the other part thereof as it would without such differential adjustment, and thereby inaccuracies of manufacture can be compensated for and correct current indications obtained at both sides of the zero point on the calibrated dial 7. For example, in the positions of the adjusting members 1 illustrated in the drawings, it has been found that, for a given strength of current, the pointer 12 will not move so far to the left as it would without these members 1, and that it will move correspondingly farther to the right. It has been found that a range of adjustment to the extent of about one-third of the scale can be effected and that this is ample for all practical purposes. In making this differential adjustment of the instrument the position of the pointer 12 relatively to the zero point will be slightly affected, but this displacement of the pointer can be readily corrected by slightly bending the pointer 12 so it will stand at the zero indication in the no current condition of the circuit in which the instrument is included. All of the dials 7 are calibrated alike and each instrument before it leaves the factory is tested and the magnetic members 1 adjusted to positions which will cause the pointer 12 to indicate correctly at both sides of the zero point.

In the drawings the pivotally shiftable polar extensions 1 are shown as adjusted to different angular positions in which both are above or inward from the axis of the pivoted magnetic armature 8, but it should be understood that similar though lesser results would follow by correspondingly shifting both of these members 1 downward or outward from the axis of the armature 8. Also one of these members can be swung upward and the other downward and a differential or distorting effect be produced. Furthermore, if desired, both of the polar extensions 1 can be turned toward and into contact with each other, thereby producing a weak closed magnetic shunt equally affecting the whole field; or both of the members 1 can be turned back alongside of the poles of the magnet 4, and in this position their effect would be substantially nullified and the field would retain its greatest strength.

It is obvious that various modifications may be made in the construction shown in the drawings and above particularly described within the principle and scope of my invention.

I claim:

1. An electrical measuring instrument comprising a permanent magnet having opposed poles, a pivoted magnetic indicating armature in the field of the magnet and pivotally movable to give current indications at opposite sides of a zero point, an electric coil for deflecting the armature on its pivot in one direction or the other according to the direction of current through the coil, a magnetic core for the coil having a head extended transversely between the poles of the permanent magnet, and means for distorting the magnetic field so as to correct the current indications at both sides of the zero point.

2. An electrical measuring instrument comprising a permanent magnet having opposed poles, a pivoted magnetic indicating armature in the field of the magnet and pivotally movable to give current indications at opposite sides of a zero point, an electric coil for deflecting the armature on its pivot in one direction or the other according to the direction of current through the coil, a magnetic core for the coil having a head extended transversely between the poles of the permanent magnet, and a pivotally shiftable polar extension from one of the magnet poles for influencing the armature to give like current indications at opposite sides of the zero point.

3. An electrical measuring instrument comprising a permanent magnet having opposed poles, a pivoted magnetic indicating armature in the field of the magnet and pivotally movable to give current indications at opposite sides of a zero point, an electric coil for deflecting the armature on its pivot in one direction or the other according to the direction of current through the coil, a magnetic core for the coil having a transversely extended head forming a pole piece partly bridging the space between the magnet poles at the side of the armature, and a pivotally shiftable polar extension from each of the magnet poles for distorting the magnetic field so as to influence the armature to give correct current indications at both sides of the zero point.

4. An electrical measuring instrument comprising a permanent magnet having opposed poles, a pivoted magnetic indicating armature in the field of the magnet and pivotally movable to give current indications at opposite sides of a zero point, an electric coil for deflecting the armature on its pivot in one direction or the other according to the direction of current through the coil, a magnetic core for the coil having a transversely extended head forming a pole piece partly bridging the space between the magnet poles at the side of the armature, and a pair of independently pivotally shiftable magnetic adjusting members in the magnetic field for adjusting the instrument to give correct current indications at both sides of the zero point.

5. An electrical measuring instrument having, in combination, a permanent field magnet having opposed poles, a non-magnetic supporting plate for such magnet, and a pair of pivotally shiftable pole pieces forming polar extensions pivoted to the non-magnetic magnet supporting plate.

6. An electrical measuring instrument having, in combination, a permanent field magnet having opposed poles, a non-magnetic supporting plate for such magnet, a pair of pivotally shiftable pole pieces forming polar extensions pivoted to the non-magnetic magnet-supporting plate at the side thereof opposite to the magnet, and magnetic pivot screws for the pole pieces passing through the non-magnetic supporting plate into close magnetic relation with the poles of the magnet.

In testimony whereof I have affixed my signature in presence of two witnesses.

WALTER E. BEEDE.

Witnesses:
WM. ASHLEY KELLY,
JOSEPH F. DUNN.